United States Patent
Heck et al.

(10) Patent No.: US 12,355,558 B2
(45) Date of Patent: Jul. 8, 2025

(54) SYSTEM, APPARATUS AND METHOD FOR COMMUNICATING WITH A VARIABLE BIT ERROR RATE

(71) Applicant: Intel Corporation, Santa Clara, CA (US)

(72) Inventors: Howard Heck, Tigard, OR (US); Huimin Chen, Beaverton, OR (US); Marko Balogh, Stanford, CA (US)

(73) Assignee: Intel Corporation, Santa Clara, CA (US)

( * ) Notice: Subject to any disclaimer, the term of this patent is extended or adjusted under 35 U.S.C. 154(b) by 777 days.

(21) Appl. No.: 17/482,686

(22) Filed: Sep. 23, 2021

(65) Prior Publication Data
US 2022/0014304 A1 Jan. 13, 2022

(51) Int. Cl.
*H04L 1/00* (2006.01)

(52) U.S. Cl.
CPC .......... *H04L 1/0009* (2013.01); *H04L 1/0083* (2013.01)

(58) Field of Classification Search
CPC ... H04L 1/0009; H04L 1/0083; H04L 1/0041; H04L 1/0007
See application file for complete search history.

(56) References Cited

U.S. PATENT DOCUMENTS

| | | | |
|---|---|---|---|
| 9,800,001 B2 | 10/2017 | Jaussi et al. | |
| 10,025,748 B2 | 7/2018 | Chen et al. | |
| 10,581,545 B2 | 3/2020 | Chen et al. | |
| 10,997,016 B2 | 5/2021 | Chen et al. | |
| 11,569,939 B1 * | 1/2023 | Krishnamurthy | H04L 1/1607 |
| 2002/0174392 A1 * | 11/2002 | Chang | G11C 8/12 |
| | | | 714/718 |
| 2013/0215942 A1 * | 8/2013 | Addepalli | H04L 1/007 |
| | | | 375/259 |
| 2020/0126187 A1 * | 4/2020 | Park | H04N 19/85 |
| 2020/0226091 A1 * | 7/2020 | Harriman | G06F 13/4282 |
| 2022/0094476 A1 * | 3/2022 | Yang | H04L 1/1671 |

* cited by examiner

*Primary Examiner* — Yemane Mesfin
*Assistant Examiner* — Jia Hao Deng
(74) *Attorney, Agent, or Firm* — Essential Patents Group, LLP; Christopher K. Gagne

(57) ABSTRACT

In one embodiment, an apparatus includes: a transmitter to receive application-specific data and protocol information and to send the application-specific data and the protocol information to a destination circuit via a link; and a protocol engine coupled to the transmitter, where the protocol engine is to cause the transmitter to send the application-specific data according to a first bit error rate (BER) and send the protocol information according to a second BER, the first BER greater than the second BER. Other embodiments are described and claimed.

18 Claims, 7 Drawing Sheets

SYSTEM, APPARATUS AND METHOD FOR COMMUNICATING WITH A VARIABLE BIT ERROR RATE

BACKGROUND

Computing systems communicate via one or more links that interconnect the systems. Depending on a protocol, a given bit error ratio (BER) is mandated to ensure application dependent reliability requirements are met. Different links operate at different BERs, which in some cases can range between a higher BER, allowing for more bit errors, e.g., at $10^{-9}$, to more stringent BERs down to $10^{-19}$. A BER target is achieved either uncorrected without channel coding or after applying channel coding such as forward error correction (FEC). In either case, the communication protocol of a link is constructed on the assumption of fixed BER.

DETAILED DESCRIPTION

Figure 1:
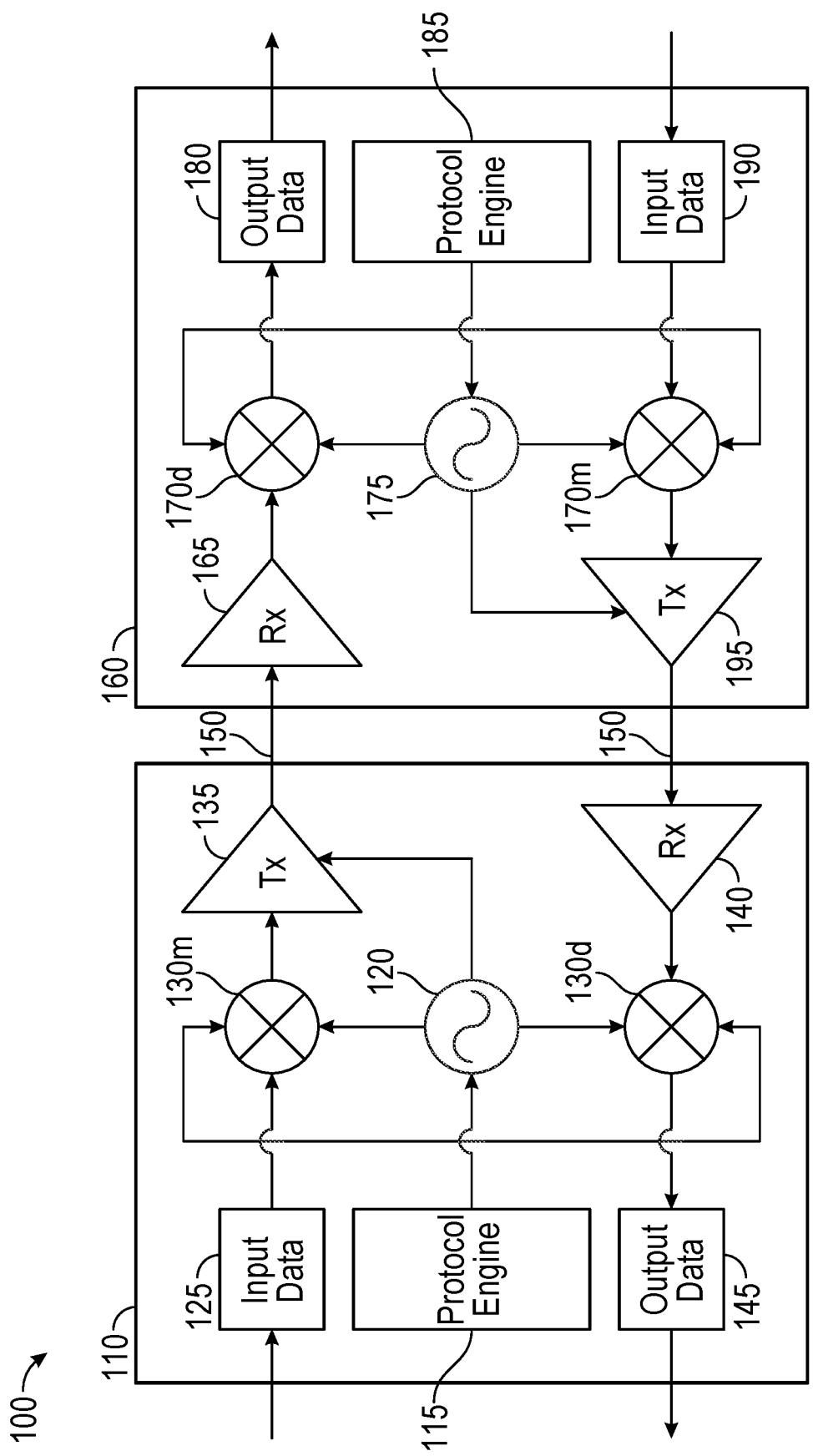
FIG. 1 is a block diagram of a system in accordance with an embodiment.

In various embodiments, a communication link can be controlled to operate with variable BERs for different applications, while preserving the integrity of a communication protocol. To this end, communications may be sent at different BER levels between the communication protocol and data. In other words, for communications between two entities, there is no ambiguity, meaning error-free operation. For data transfers, also referred to as packet payloads, depending on application, BER requirements can vary or even be adaptive.

By providing multiple BER mode capabilities, performance can be optimized in the presence of applications with differing reliability requirements, such as optimizing latency and power by turning off any forward error correction when running in a relaxed BER mode, reducing power consumption by reducing transmitter output signal amplitude when running in relaxed BER mode, and/or increasing performance by using a higher signaling rate or encoding more information per baud when running in relaxed BER mode.

While different applications may benefit from embodiments, for purposes of discussion, consider distributed processing in neural networks, which is highly robust in the presence of errors. A deep neural network maps a high-dimensional space (e.g., 100×100 images=10,000 dimension vector space) to a lower dimensional space (e.g., a handful of categories). In fact, almost all information provided to a neural network is destroyed. For example, autonomous vehicles only care about detecting pedestrians, not the exact location of each strand of hair on the person, even though sensors may provide that information. As such, this application is robust to transmission errors in high-speed signaling interfaces.

As one example of this scenario, an image classification neural network can be trained with a relaxed BER. In one test case, classification accuracy may remain within 1% of a baseline case (having no bit errors) with a relaxed BER exceeding $10^{-3}$. And further, a 1% decrease in classification performance may occur at BERs between $10^{-2}$ and $10^{-3}$.

Note in some cases, it is possible for a plurality of BERs to be used for data communications for a given application, e.g., in an adaptive manner. For example, during initial training data communications can occur in a fully relaxed BER mode with a relatively high BER (e.g., $10^{-2}$), as the classifier is seeking to identify a class of object (e.g., animal or person). Then as the classifier becomes better trained, images with more characteristics (e.g., at higher resolutions) may be used for additional training (e.g., identifying a particular animal or performing facial recognition). In these cases, a lower but still relaxed BER mode may be used for data communication (e.g., $10^{-3}$). As training progresses towards higher accuracy, error tolerance to data is lower and a BER requirement may become stringent. This process may continue with progressive BER targets programmed to facilitate a successful training.

In a system implementation at a high level, typical interface circuitry for a communication link includes three basic layers to facilitate a successful data transfer between two entities. A physical layer is responsible for transmission of information from one entity to another entity, in physical means such as electrical or optical signals. A data link layer (more generally referred to as a "link layer") coupled to the physical layer is responsible to ensure integrity of the data transfer, so that communication between the two entities flows through each other without ambiguity. A transport or transaction layer above the data link layer is responsible for facilitating intended data transfer between the two entities by packing and unpacking payload information.

Among the three layers, the information exchanged between the two entities can be classified into two different information types, namely protocol information to deliver a communication service and data information to facilitate an application-specific data transfer.

In embodiments, the protocol information may be exchanged with no room for errors so that each entity understands the actions or operations the other may take. Data information, on the other hand, is subject to application requirements. In a case where data transfer regards a file transfer, no error can be tolerated. Typical communication protocols are defined to assume error-free communications, thus posing a very stringent BER requirement. Furthermore, if an error is detected, the entities may perform a recovery process to correct the errors. Examples of such processes include retry or self-error correction. In another case where data transfer regards an image or video for object recognition and classification, pixel errors within a data stream may be forgiven. Emerging applications of artificial intelligence/machine learning (AI/ML) consume a lot of data for training purposes. Depending on the training requirement, errors in data transfers may be tolerable. Embodiments may thus take advantage of workload differences by providing a communication link that can manage BER requirements of the data transfer during runtime Referring now to FIG. 1, shown is a block diagram of a system in accordance with an embodiment in which information may be communicated across a link with variable BERs. More specifically a system 100 may be any type of environment having multiple computing systems. In different implementations, the various entities of system 100 may range from relatively small devices including laptops, personal computers, and so forth, to larger systems such as server systems, distributed computing systems such as data center systems or so forth. In system 100, a first entity 110 is in communication with a second entity 160 via a link 150. While in FIG. 1, a dual-simplex link is illustrated, understand embodiments are not limited in this regard. As examples, entities 110 and 160 may be distributed computing entities within a data center, such as a first processor-based system in communication with a data source such as a disk storage system or so forth and a second processor-based system that may be a consumer of such data. For example, in embodiments herein, an AI or ML classifier may be trained and execute on entity 160. For ease of discussion herein, these entities may also be referred to generically as "systems."

In the high level shown in FIG. 1, entity 110 includes a protocol engine 115, which may include one or more layers of a communication stack. Although embodiments are not limited in this regard, protocol engine 115 may communicate according to one or more communication protocols such as a given Universal Serial Bus (USB) or Peripheral Component Interconnect Express (PCIe) protocol. In other cases, the variable BER communications described herein may occur using another communication protocol.

In a transmit direction, input data 125 (which may be image data), is provided to a modulator $130_m$, which modulates the data according to protocol engine 115 control and further according to a transmit clock provided by a clock source 120. In turn, the modulated data is sent along link 150 to second entity 160 via a transmitter 135.

First entity 110 also includes, in a receive direction, a receiver 140 which provides received information to a demodulator $130d$ which demodulates the information and provides the underlying information as output data 145.

Understand that second entity 160 may be similarly arranged, with a receiver 165 and demodulator $170d$, to obtain output data 180 (which may correspond to input data 125). As further shown, second entity 160 also includes a protocol engine 185 in communication with a clock source 175 and demodulator $170_d$ and a modulator $170_m$ that receives input data 190, modulates it and provides it to a transmitter 195.

As will be described further herein, communications via link 150 may occur with variable BER depending upon the type of information being communicated. Such dynamic control of communications may occur under control of protocol engines 115, 185. These protocol engines may dynamically control communications to occur with variable BERs, depending upon the type of information being communicated. Such control may occur in response to an indication of the type of information, which may be received from an application. Understand while shown at this high level in the embodiment of FIG. 1, many variations and alternatives are possible.

Figure 2:
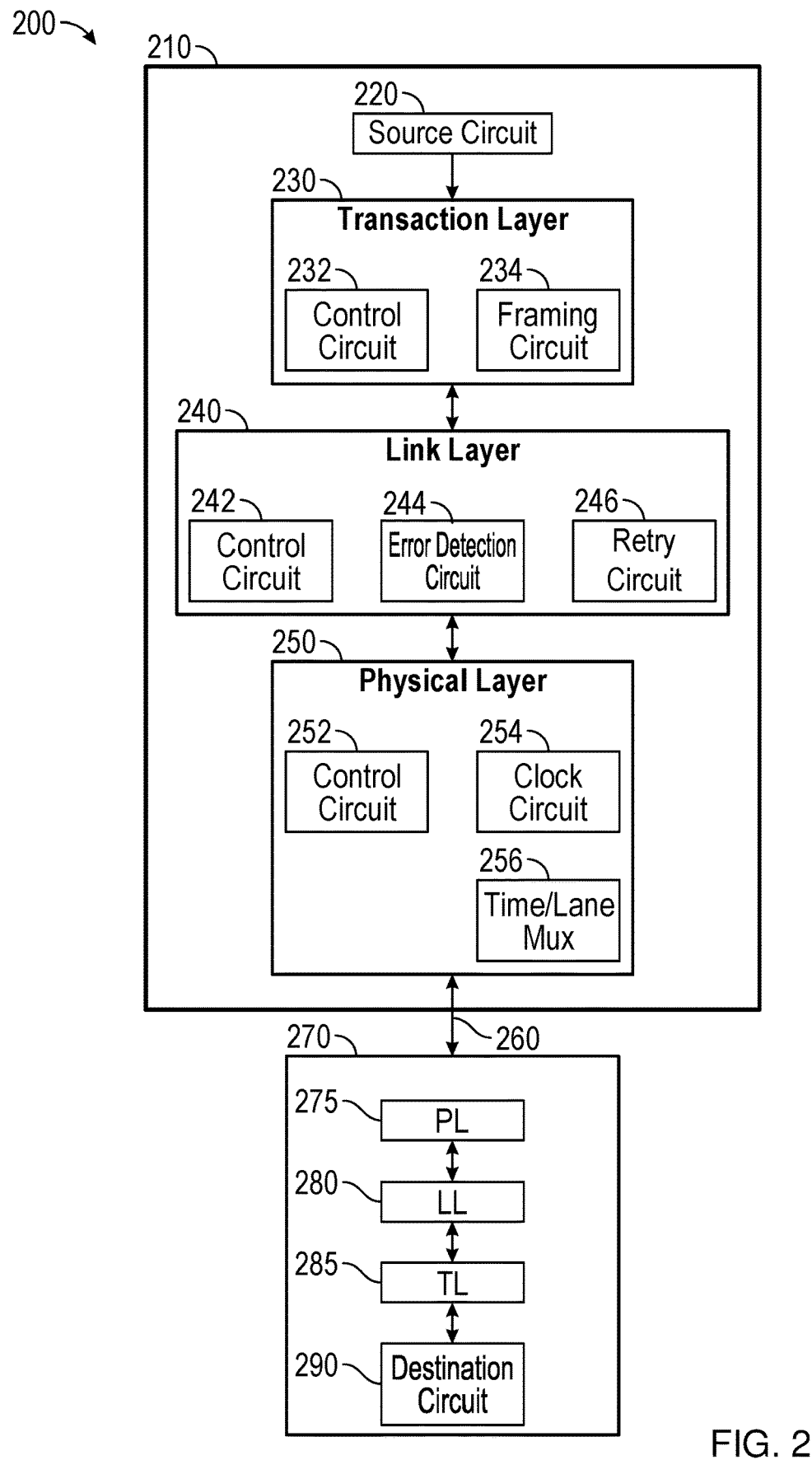
FIG. 2 is a block diagram of a computing environment in accordance with an embodiment.

Referring now to FIG. 2, shown is a block diagram of a computing environment in accordance with an embodiment. As shown in FIG. 2, environment 200 includes a first system 210 that communicates with a second system 270 via a link 260. Although embodiments are not limited in this regard, in different implementations link 260 may be a USB or PCIe link, as examples.

Beginning with first system 210, a source circuit 220 is present. Source circuit 220 may be any type of processor or other hardware circuit that can access and provide application-specific data. Continuing with the example use case herein, assume that source circuit 220 is a host processor of system 210, which may access image data stored in a database (not shown for ease of illustration in FIG. 2). In turn, source circuit 220 provides the image data to an interface circuit that includes a transaction layer 230. Transaction layer 230 along with a link layer 240 and a physical layer 250 may form a protocol stack or engine of an interface circuit to ensure reliable data communications.

In the high level shown in FIG. 2, transaction layer 230 includes a control circuit 232 and a framing circuit 234. In this way, transaction layer 230 may frame the incoming image or other application-specific data into packets or other chunks for communication to link layer 240. As shown, link layer 240 includes a control circuit 242 that configures an error detection circuit 244 and a retry circuit 246 for operation. In embodiments herein, when a relaxed BER mode is active, control circuit 242 may disable one or both of error detection circuit 244 and retry circuit 246 for payload communications. Otherwise when enabled, the circuits may insert link layer information in the form of error detection information such as checksums or so forth, and/or error correction information, such as error correction coding for the received data. In turn, retry circuit 246 may trigger a replay of information that is not correctly received.

Still with reference to FIG. 2, physical layer 250 includes a control circuit 252 that controls operation of physical layer 250. In embodiments herein, control circuit 252 may control a clock frequency used to communicate information by appropriate control of clock circuit 254. In this way, application-specific data may be communicated at a higher data rate than protocol information. Control circuit 252 further may control multiplexer 256 such that application-specific data and protocol information may be appropriately time and/or lane multiplexed. For example, one lane may be configured for communicating protocol information at a low BER and one or more other lanes may be configured for communicating data information at a relaxed BER.

An alternative mechanism of multiplexer 256 may employ time-division multiplexing. In this mechanism, certain time slots may be reserved for protocol information communication (e.g., command and/or control information) at a low BER and other time slots can be reserved for data information communication at a relaxed BER. Such time division multiplexing may be constructed during link initialization and configuration. In some other cases, a packet division multiplexing may be constructed, in which a packet header and a packet payload are sent. The packet header may be introduced at the beginning of a packet. It is transmitted based on a lower BER and may include one or more fields to identify variable BER capability of packet data and its packet duration before start of a next packet that may contain a different BER and duration. Following the packet header, the packet payload that contains data is transmitted at the relaxed BER described in the packet header.

Thus embodiments may communicate with variable BERs in different manners. One technique is via lane division multiplexing. Another technique is via time division multiplexing. And a third technique is via packet division multiplexing with a packet header for information at a first BER and a packet payload for data at a second BER. Both lane division and time division multiplexing may be fixed-division multiplexing, which may be relatively simple but less flexible. Packet division may be a bit complex but is more flexible.

Destination system 270 may be similarly configured, including interface circuitry having a physical layer 275, a link layer 280 and a transaction layer 285. As further shown, a destination circuit 290 is present. Destination circuit 290 may be one or more processors of second system 270. In embodiments herein, destination circuit 290 may execute a ML classifier or other machine learning algorithm to use incoming application-specific data, e.g., for training or classification purposes. With embodiments herein, understand that this application-specific data may be lossy data which, even when errors are present, may be fully used for performing training and/or classification.

Figure 3:
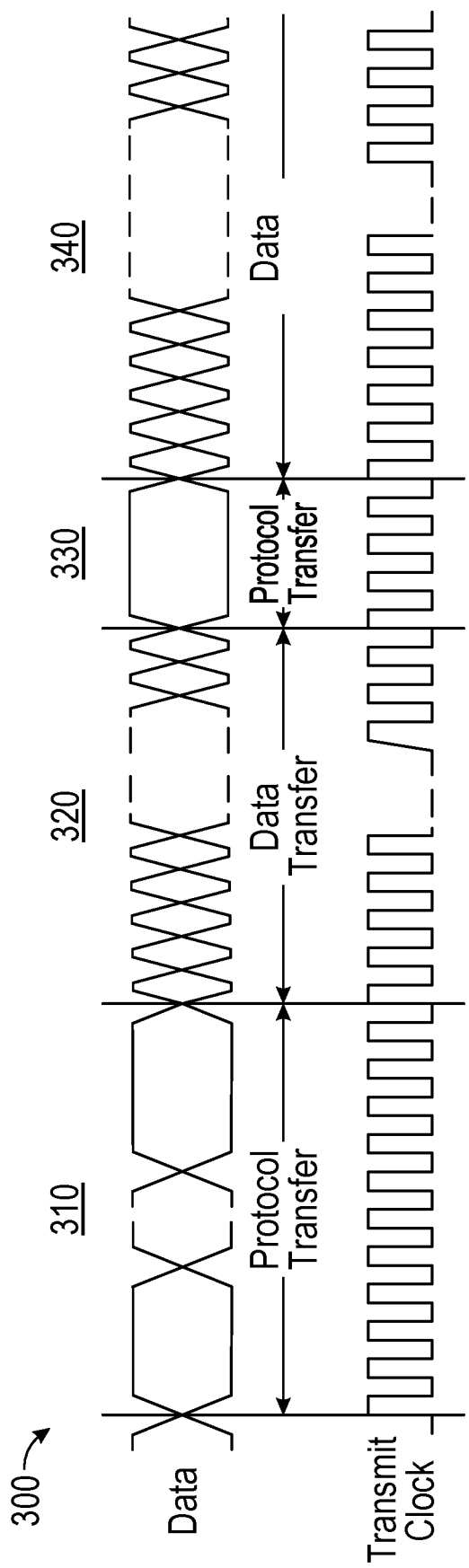
FIG. 3 is a timing diagram illustrating data transfers in accordance with an embodiment.

Referring now to FIG. 3, shown is an example timing diagram illustrating data transfers with variable BERs in accordance with an embodiment based on either time-division multiplexing or packet-division multiplexing. As shown in FIG. 3, in timing diagram 300 during a first time segment 310, a protocol transfer occurs in which protocol information is communicated. As shown, this protocol transfer may proceed with each data bit sent at multiple transmit clock cycles. In this way, a relatively low data rate may occur, such that a limited bandwidth inheres. This protocol transfer may include various protocol information such as command or control information, header information or so forth.

Instead during time segment 320, a data transfer in which data information is communicated occurs. As shown, a single bit is communicated for a single clock cycle. In this way, a relatively higher data rate and increased bandwidth may be realized for these data transfers, which may accommodate some amount of errors as lossy data. Similar protocol and data transfers proceed at further time segments 330 and 340. Understand that while shown at this high level in FIG. 3, data communications at dynamic clock rates may proceed in other manners. For example, the clock frequency may be increased during data transfers and decreased during protocol information transfers.

Figure 4:
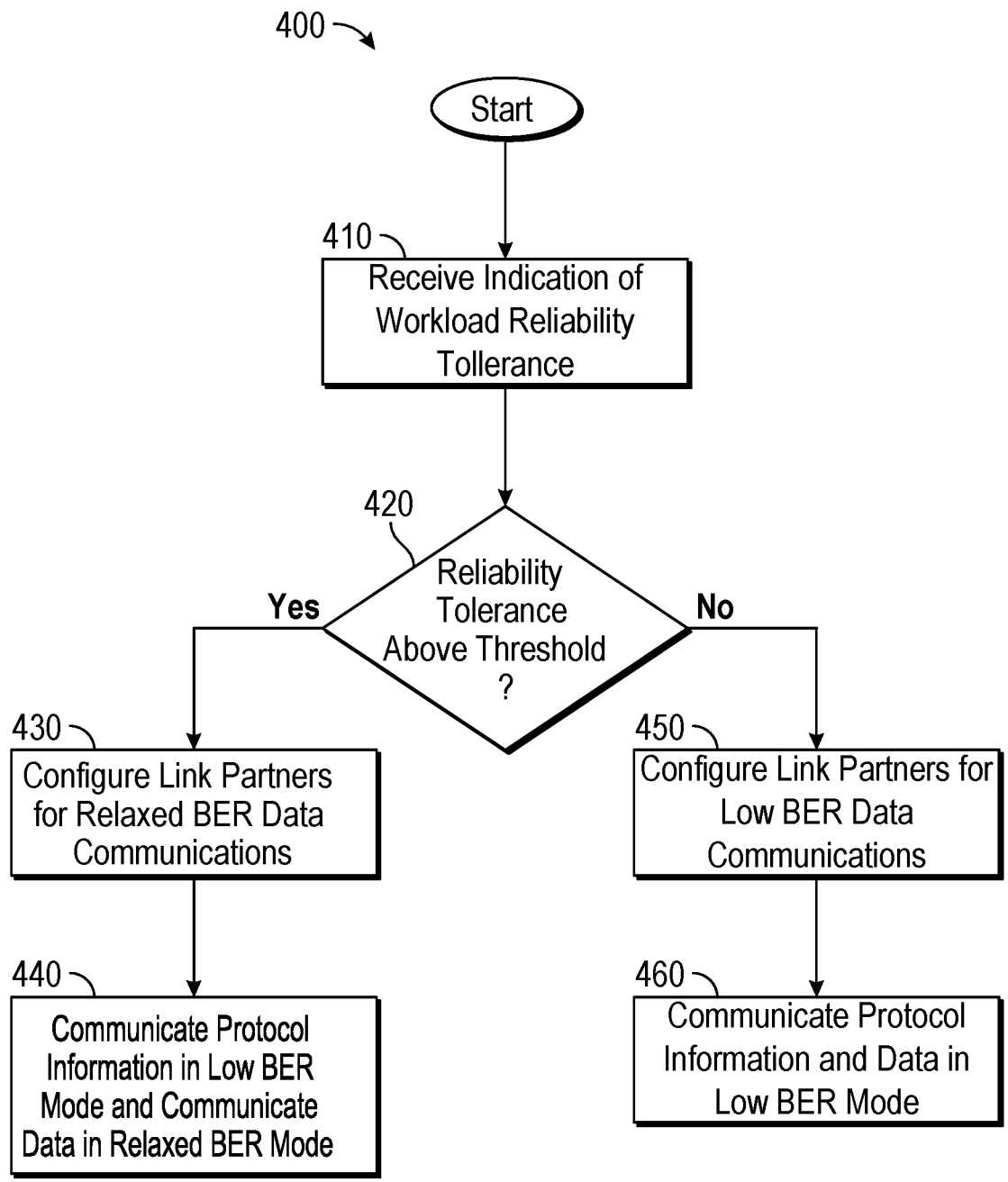
FIG. 4 is a flow diagram of a method in accordance with an embodiment.

Referring now to FIG. 4, shown is a flow diagram of a method in accordance with an embodiment. As shown in FIG. 4, method 400 is a high level method for communicating data at variable BERs across a link. As such, method 400 may be performed by link partners, such as interface circuits of the two link partners, which may include hardware circuitry that alone, or in combination with firmware and/or software, may execute method 400. As illustrated, method 400 begins by receiving an indication of a workload reliability tolerance (block 410). This indication may be received from an application which may identify an acceptable BER for the application. Continuing with the above example of a machine learning image-based classifier, assume that the application indicates that it may tolerate data having a BER of $10^{-2}$.

Still with reference to FIG. 4, control next passes to diamond 420 to determine whether the reliability tolerance is above a threshold. This threshold may correspond to a baseline level of BER for a given protocol or interface circuit itself. If it is determined that the reliability tolerance is above the threshold, meaning that the application can handle incoming information having a relaxed BER, i.e., more bit errors than a threshold bit error level, at block 430 the link partners may be configured for relaxed BER data communications. For example as described above, link layer circuitry for performing error detection, correction and/or retries may be disabled for data transfers. Furthermore, clock circuitry may be controlled to provide an increased clock frequency for data communications. Control next passes to block 440 where protocol information may be communicated in a low BER mode. However, data communications may be sent in a relaxed BER mode, thus increasing bandwidth and/or reducing power consumption.

Instead if it is determined that the reliability tolerance is not above the threshold, control passes to block 450 where the link partners may be configured for low BER data communications. Control then passes to block 460 where both protocol information and data may be communicated in a low BER mode.

Figure 5:
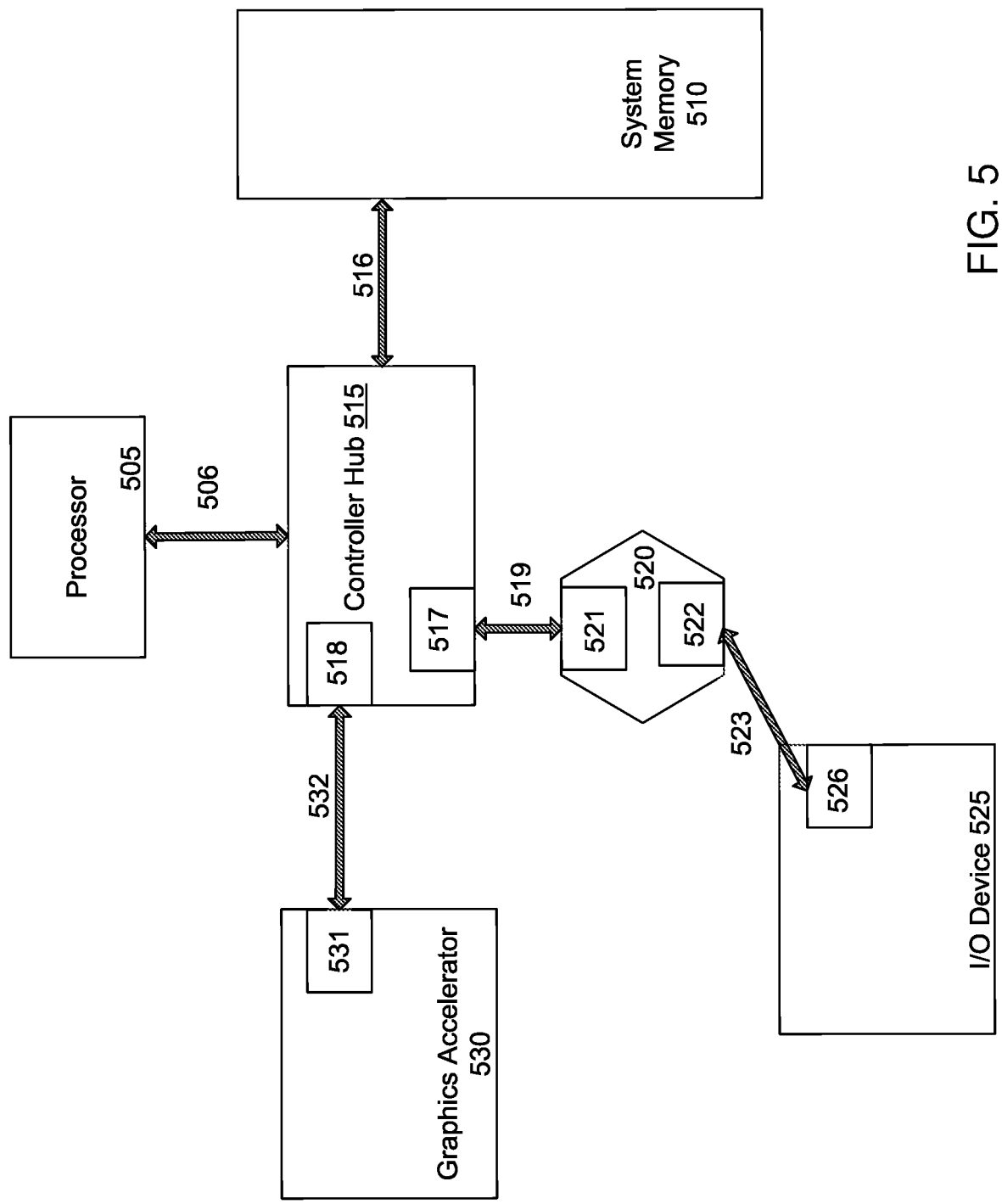
FIG. 5 is an embodiment of a fabric composed of point-to-point links that interconnect a set of components.

Embodiments may be implemented in a wide variety of interconnect structures. Referring to FIG. 5, an embodiment of a fabric composed of point-to-point links that interconnect a set of components is illustrated. System 500 includes processor 505 and a system memory 510 coupled to controller hub 515. Processor 505 includes any processing element, such as a microprocessor, a host processor, an embedded processor, a co-processor, or other processor. Processor 505 is coupled to controller hub 515 through front-side bus (FSB) 506. In one embodiment, FSB 506 is a serial point-to-point interconnect.

System memory 510 includes any memory device, such as random access memory (RAM), non-volatile (NV) memory, or other memory accessible by devices in system 500. As shown, system memory 510 is coupled to controller hub 515 through memory interface 516. Examples of a memory interface include a double-data rate (DDR) memory interface, a dual-channel DDR memory interface, a dynamic RAM (DRAM), and/or a SPI memory interface.

In one embodiment, controller hub 515 is a root hub, root complex, or root controller in a PCIe interconnection hierarchy. Examples of controller hub 515 include a chipset, a memory controller hub (MCH), a northbridge, an interconnect controller hub (ICH), a southbridge or peripheral controller hub (PCH), and a root controller/hub. Often the term chipset refers to two physically separate controller hubs, i.e. a memory controller hub (MCH) coupled to an interconnect controller hub (ICH). Note that current systems often include the MCH integrated with processor 505, while controller 515 is to communicate with I/O devices. In some embodiments, peer-to-peer routing is optionally supported through root complex 515.

Here, controller hub 515 is coupled to switch/bridge 520 through serial link 519. Input/output modules 517 and 521, which may also be referred to as interfaces/ports 517 and 521, include/implement a layered protocol stack to provide communication between controller hub 515 and switch 520. In one embodiment, multiple devices are capable of being coupled to switch 520.

Switch/bridge 520 routes packets/messages from device 525 upstream, i.e., up a hierarchy towards a root complex, to controller hub 515 and downstream, i.e., down a hierarchy away from a root controller, from processor 505 or system memory 510 to device 525. Switch 520, in one embodiment, is referred to as a logical assembly of multiple virtual PCI-to-PCI bridge devices. Device 525 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such a device is referred to as an endpoint. Although not specifically shown, device 525 may include a PCIe to PCI/PCI-X bridge to support legacy or other version PCI devices. Endpoint devices in PCIe are often classified as legacy, PCIe, or root complex integrated endpoints.

Graphics accelerator 530 is also coupled to controller hub 515 through serial link 532. In one embodiment, graphics accelerator 530 is coupled to an MCH, which is coupled to an ICH. Switch 520, and accordingly I/O device 525, is then coupled to the ICH. I/O modules 531 and 518 are also to implement a layered protocol stack to communicate between graphics accelerator 530 and controller hub 515. A graphics controller or the graphics accelerator 530 itself may be integrated in processor 505. Understand that any of the interconnects shown in FIG. 5 may be configured to enable relaxed BER communication of data information, while communicating protocol information at a given BER for the given protocol, as described herein.

Figure 6:
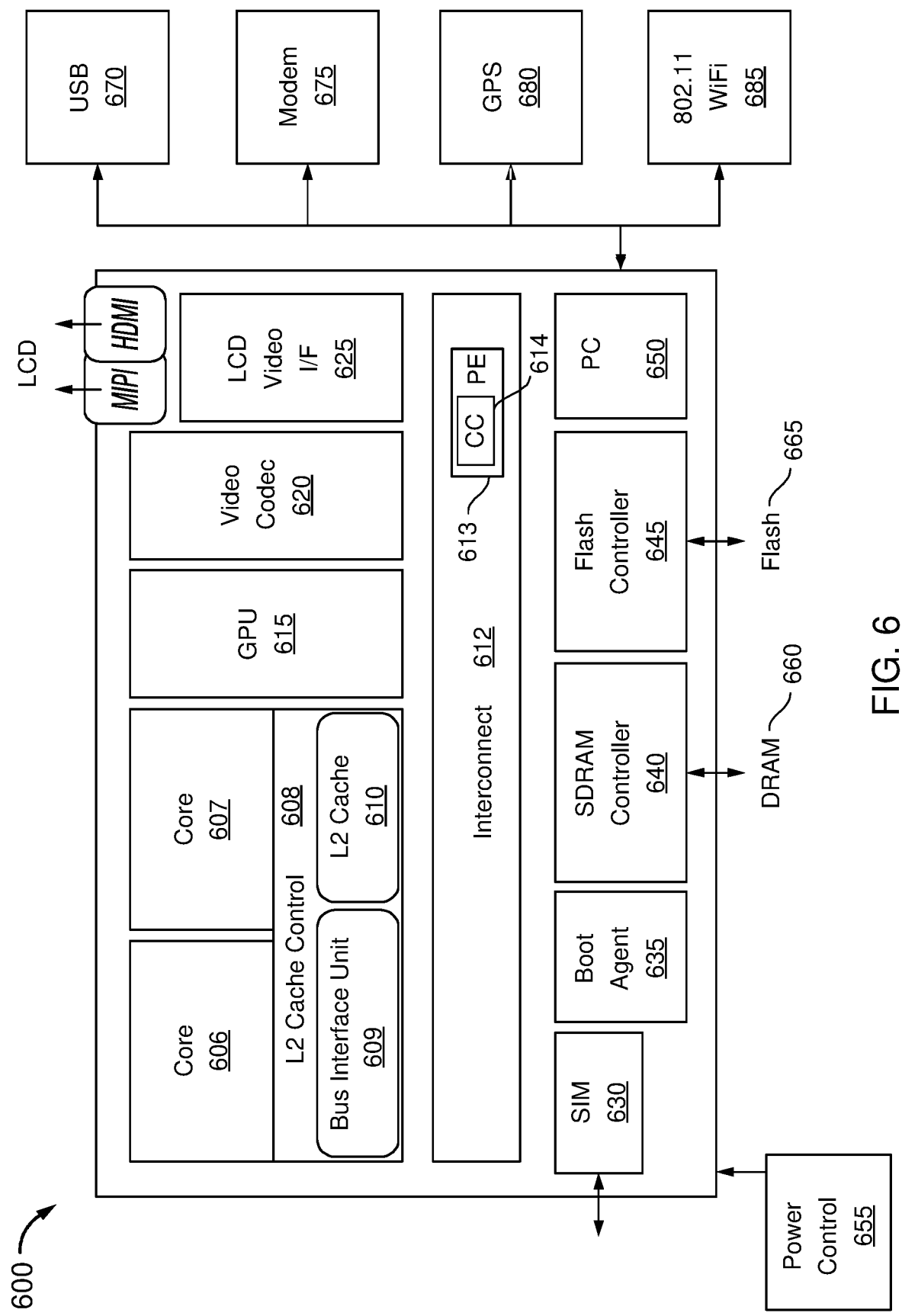
FIG. 6 is an embodiment of a system-on-chip design in accordance with an embodiment.

Turning next to FIG. 6, an embodiment of a SoC design in accordance with an embodiment is depicted. As a specific illustrative example, SoC 600 may be configured for insertion in any type of computing device, ranging from portable device to server system. Here, SoC 600 includes 2 cores 606 and 607. Cores 606 and 607 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 606 and 607 are coupled to cache control 608 that is associated with bus interface unit 609 and L2 cache 610 to communicate with other parts of system 600 via an interconnect 612. As shown, interconnect 612 may include a protocol engine 613 having a control circuit 614, which may dynamically control communications to occur with variable BERs as described herein.

Interconnect 612 provides communication channels to the other components, such as a Subscriber Identity Module (SIM) 630 to interface with a SIM card, a boot agent 635, a SDRAM controller 640 to interface with external memory (e.g., DRAM 660), a flash controller 645 to interface with non-volatile memory (e.g., flash 665), a peripheral controller 650 (e.g., an eSPI interface) to interface with peripherals, video codecs 620 and video interface 625 to display and receive input (e.g., touch enabled input), and a GPU 615 to perform graphics related computations, etc.

In addition, the system illustrates peripherals for communication, such as via a USB interface 670, 5G modem 675, and GPS 680 and WiFi components 685. Also included in the system is a power controller 655.

Figure 7:
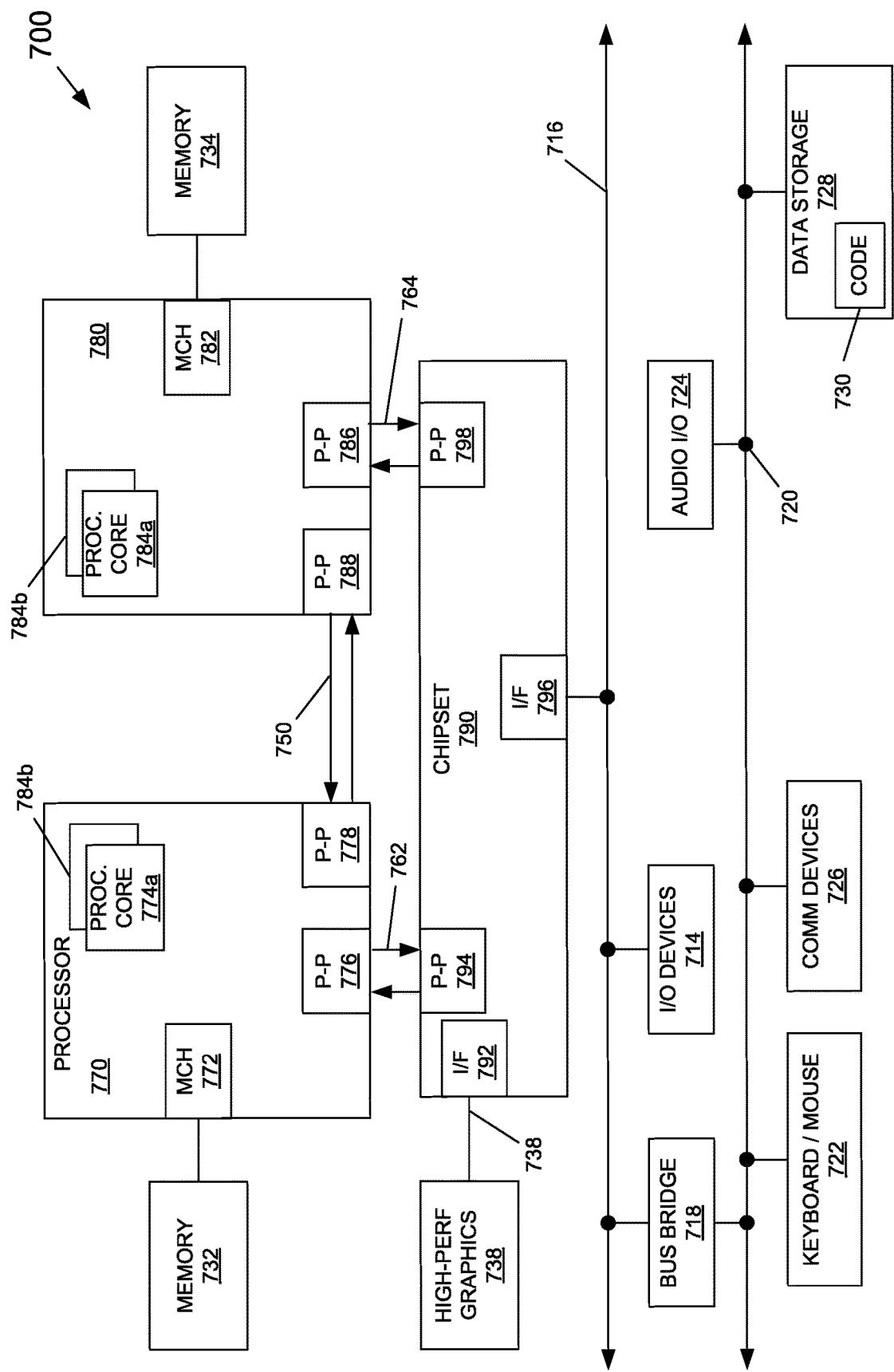
FIG. 7 is a block diagram of a system in accordance with an embodiment of the present invention.

Referring now to FIG. 7, shown is a block diagram of a system in accordance with an embodiment of the present invention. As shown in FIG. 7, multiprocessor system 700 includes a first processor 770 and a second processor 780 coupled via a point-to-point interconnect 750. As shown in FIG. 7, each of processors 770 and 780 may be many core processors including representative first and second processor cores (i.e., processor cores 774a and 774b and processor cores 784a and 784b).

Still referring to FIG. 7, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 7, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 762 and 764, respectively. As shown in FIG. 7, chipset 790 includes P-P interfaces 794 and 798.

Furthermore, chipset 790 includes an interface 792 to couple chipset 790 with a high performance graphics engine 738, by a P-P interconnect 739. As shown in FIG. 7, various I/O devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720. In FIG. 7, any of the interconnects shown may communicate at variable BERs according to embodiments.

The following examples pertain to further embodiments.

In one example, an apparatus includes: a transmitter to receive application-specific data and protocol information and send the application-specific data and the protocol information to a destination circuit via a link; and a protocol engine coupled to the transmitter, where the protocol engine is to cause the transmitter to send the application-specific data according to a first BER and send the protocol information according to a second BER, the first BER greater than the second BER.

In an example, the protocol engine is to cause the transmitter to send the application-specific data according to the first BER in response to an indication of a BER requirement of an application that is to consume the application-specific data.

In an example, when the application comprises a classifier and the application-specific data comprises image data, the transmitter is to send the application-specific data according to a plurality of BERs for each of a plurality of resolutions of the image data.

In an example, the protocol engine comprises a link layer to apply error detection information to the protocol information and to not apply error detection information to the application-specific data.

In an example, the transmitter is to send the protocol information at a first clock rate and send the application-specific data at a second clock rate, the second clock rate greater than the first clock rate.

In an example, the transmitter is to send each bit of the protocol information for a plurality of consecutive clock cycles and send each bit of the application-specific data for a single clock cycle.

In an example, the transmitter is to time multiplex the protocol information and the application-specific data.

In an example, the transmitter is to send the protocol information along at least one first lane of the link and send the application-specific information along at least one second lane of the link.

In an example, the protocol engine is to cause the transmitter to send a packet header according to the second BER, the packet header including the protocol information and packet payload information comprising a payload size and an indication of the first BER.

In an example, the protocol engine is to cause the transmitter to send, after the packet header, a packet payload according to the first BER, the packet payload including the application-specific data.

In another example, a method includes: receiving in an interface circuit of a system, from an application, an indication of a workload reliability tolerance for the application; communicating protocol information at a BER from the interface circuit of the system to a second system via a link; and in response to the indication, communicating data information of the application at a second BER from the interface circuit of the system to the second system via the link, the second BER higher than the first BER.

In an example, the method further comprises configuring the interface circuit to communicate the protocol information at a first rate and communicate the data information at a second rate, the second rate greater than the first rate.

In an example, the method further comprises configuring the interface circuit to communicate the protocol information with a first signal swing and communicate the data information with a second signal swing, the first signal swing greater than the second signal swing.

In an example, the method further comprises configuring the interface circuit to perform error correction coding for the protocol information and to not perform error correction coding for the data information.

In an example, the method further comprises configuring the interface circuit to retry the communication of at least a portion of the protocol information and to not retry the communication of the data information.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In yet another example, a system comprises: a first system comprising at least one processor and a first interface circuit, and a second system coupled to the first system via a link. The first interface circuit may include: a transaction layer to frame data information from a source circuit into at least one packet; a link layer coupled to the transaction layer, the link layer to integrity protect the at least one packet; and a physical layer coupled to the link layer to communicate the at least one packet to a second system, where the first interface circuit is to send application-specific data of the at least one packet according to a first BER and send protocol information of the at least one packet according to a second BER, the first BER greater than the second BER.

In an example, the first interface circuit is to send the application-specific data according to the first BER in response to an indication of a BER requirement of an application that is to consume the application-specific data.

In an example, when the application comprises a classifier and the application-specific data comprises image data, the first interface circuit is to send the application-specific data according to a plurality of BERs for each of a plurality of resolutions of the image data.

In an example, the link layer is to apply error detection information to the protocol information and to not apply error detection information to the application-specific data.

In an example, the first interface circuit is to send the protocol information at a first clock rate and send the application-specific data at a second clock rate, the second clock rate greater than the first clock rate.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
   a transmitter to receive application-specific data and protocol information and send the application-specific data and the protocol information to a destination circuit via a link; and
   a protocol engine coupled to the transmitter, wherein the protocol engine is to cause the transmitter to send the application-specific data according to a first bit error rate (BER) and send the protocol information according to a second BER, the first BER greater than the second BER;
   wherein:
      the first BER is to be determined based upon acceptable BER indication data that is to be provided by an application that is to consume the application-specific data; and
      the acceptable BER indication data is to indicate an acceptable BER that the application is capable of tolerating with respect to communication of the application-specific data.

2. The apparatus of claim 1, wherein when the application comprises a classifier and the application-specific data comprises image data, the transmitter is to send the application-specific data according to a plurality of BERs for each of a plurality of resolutions of the image data.

3. The apparatus of claim 1, wherein the protocol engine comprises a link layer to apply error detection information to the protocol information and to not apply error detection information to the application-specific data.

4. The apparatus of claim 1, wherein the transmitter is to send the protocol information at a first clock rate and send the application-specific data at a second clock rate, the second clock rate greater than the first clock rate.

5. The apparatus of claim 1, wherein the transmitter is to send each bit of the protocol information for a plurality of consecutive clock cycles and send each bit of the application-specific data for a single clock cycle.

6. The apparatus of claim 1, wherein the transmitter is to time multiplex the protocol information and the application-specific data.

7. The apparatus of claim 1, wherein the transmitter is to send the protocol information along at least one first lane of the link and send the application-specific information along at least one second lane of the link.

8. The apparatus of claim 1, wherein the protocol engine is to cause the transmitter to send a packet header according to the second BER, the packet header including the protocol information and packet payload information comprising a payload size and an indication of the first BER.

9. The apparatus of claim 8, wherein the protocol engine is to cause the transmitter to send, after the packet header, a packet payload according to the first BER, the packet payload including the application-specific data.

10. At least one non-transitory computer readable storage medium comprising instructions that when executed enable a system to perform operations comprising:
receive in an interface circuit of the system, from an application, an indication of a workload reliability tolerance for the application;
communicate protocol information at a first bit error rate (BER) from the interface circuit of the system to a second system via a link; and
based upon the indication, communicate data information of the application at a second BER from the interface circuit of the system to the second system via the link, the second BER higher than the first BER:
wherein:
the application is associated with consumption of the data information; and
the workload reliability tolerance corresponds, at least in part, to an acceptable BER that the application is capable of tolerating with respect to communication of the data information.

11. The at least one non-transitory computer readable storage medium of claim 10, further comprising instructions that when executed enable the system to configure the interface circuit to communicate the protocol information at a first rate and communicate the data information at a second rate, the second rate greater than the first rate.

12. The at least one non-transitory computer readable storage medium of claim 10, further comprising instructions that when executed enable the system to configure the interface circuit to communicate the protocol information with a first signal swing and communicate the data information with a second signal swing, the first signal swing greater than the second signal swing.

13. The at least one non-transitory computer readable storage medium of claim 10, further comprising instructions that when executed enable the system to configure the interface circuit to perform error correction coding for the protocol information and to not perform error correction coding for the data information.

14. The at least one non-transitory computer readable storage medium of claim 10, further comprising instructions that when executed enable the system to configure the interface circuit to retry the communication of at least a portion of the protocol information and to not retry the communication of the data information.

15. A system comprising:
a first system comprising at least one processor and a first interface circuit, the first interface circuit comprising:
a transaction layer to frame data information from a source circuit into at least one packet;
a link layer coupled to the transaction layer, the link layer to integrity protect the at least one packet; and
a physical layer coupled to the link layer to communicate the at least one packet to a second system, wherein the first interface circuit is to send application-specific data of the at least one packet according to a first bit error rate (BER) and send protocol information of the at least one packet according to a second BER, the first BER greater than the second BER; and
the second system coupled to the first system via a link; wherein:
the first BER is to be determined based upon acceptable BER indication data that is to be provided by an application that is to consume the application-specific data; and
the acceptable BER indication data is to indicate an acceptable BER that the application is capable of tolerating with respect to communication of application-specific data.

16. The system of claim 15, wherein when the application comprises a classifier and the application-specific data comprises image data, the first interface circuit is to send the application-specific data according to a plurality of BERs for each of a plurality of resolutions of the image data.

17. The system of claim 15, wherein the link layer is to apply error detection information to the protocol information and to not apply error detection information to the application-specific data.

18. The system of claim 15, wherein the first interface circuit is to send the protocol information at a first clock rate and send the application-specific data at a second clock rate, the second clock rate greater than the first clock rate.

* * * * *